J. BUCHLI.
SHAFT COUPLING.
APPLICATION FILED NOV. 22, 1917.
1,298,881.
Patented Apr. 1, 1919.
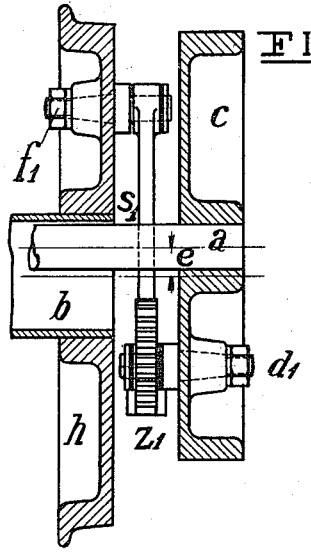
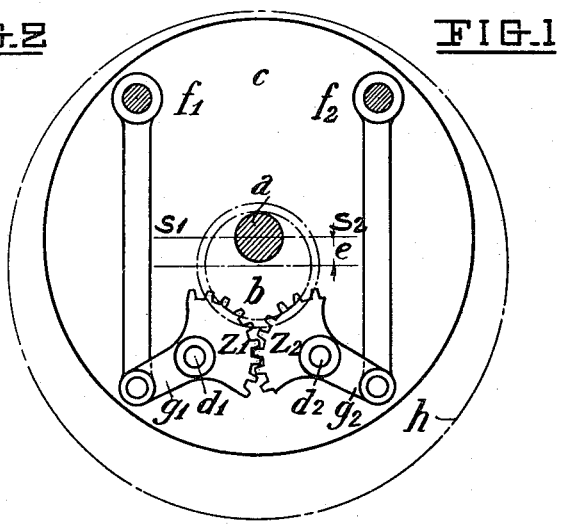
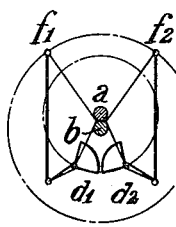
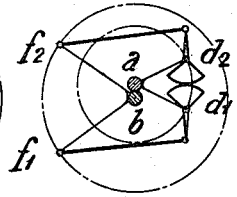
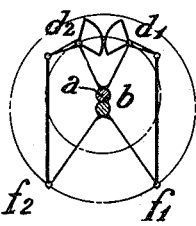
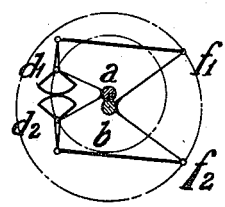
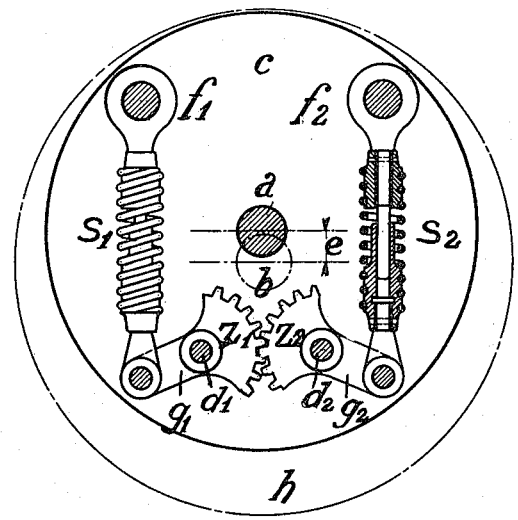
J. Buchli.
INVENTOR
BY [signature]
ATTORNEY

UNITED STATES PATENT OFFICE.

JACOB BUCHLI, OF BADEN, SWITZERLAND, ASSIGNOR TO A. G. BROWN BOVERI & CIE., OF BADEN, SWITZERLAND.

SHAFT-COUPLING.

1,298,881.   Specification of Letters Patent.   Patented Apr. 1, 1919.

Application filed November 22, 1917. Serial No. 203,349.

*To all whom it may concern:*

Be it known that I, JACOB BUCHLI, a citizen of the Swiss Republic, residing at No. 18 Ländliweg, Baden, Switzerland, have invented certain new and useful Improvements in Shaft-Couplings, of which the following is a specification.

For the purpose of coupling two shafts having equal angular velocities and, having their axes of rotation out of line with each other, it has been proposed among other devices to employ a combination of rods (of the kind disclosed in German Patent Specification No. 128,654), in which two cranks fixed on one shaft are connected by means of rods and bell crank levers to two cranks fixed on the other shaft. Such an arrangement must be unsymmetrical because in order to compensate the varying distances between the two pairs of crank pins connected to the two shafts, the arms of the two bell crank levers which are adapted to rotate about one pair of pins as axes, must be directed toward the same side. The arrangement moreover comprises eight pivot pins. In order to make the arrangement symmetrical devices have been employed located in the middle of the coupling and the rods jointed to the two crank pins of one shaft are connected to two toothed segments which are adapted to rotate on the crank pins of the other shaft and engage with each other at the center of the coupling.

For the purposes of the present invention that known arrangement cannot be employed because the two shafts to be coupled are located on the same side, that is to say, the center of the coupling is occupied by the end of the through shaft, and therefore must be kept clear of other parts. A further drawback of the known symmetrical arrangements is that the rods which connect the crank pins of one shaft to the toothed segments, are relatively short, so that the differences in the angular velocity in each revolution due to the finite length of the rods are considerable.

The present invention has for its object to provide an improved coupling for coupling two shafts having equal angular velocities and, having their axes of rotation out of line with each other. In this improved coupling which avoids all the aforestated drawbacks of the known constructions, the center is left free for a through shaft and the angular difference in each revolution is reduced to a practically unimportant amount by making the length of the rods as long as possible. The improved coupling has only six pivot pins, and in its normal position it is symmetrical to a plane passing through the centers of the two shafts, but is unsymmetrical to the plane at right angles thereto.

Two embodiments of this invention are illustrated by way of examples in the accompanying drawings in which:—

Figures 1 to 6 illustrate one embodiment,

Fig. 1 being a sectional elevation taken at right angles to the axis, and

Fig. 2 an axial section of the improved coupling;

Figs. 3, 4, 5 and 6 illustrating the positions of the parts in the four main positions of the shafts.

Fig. 7 shows a modification with elastic rods.

Referring to Figs. 1 and 2, the improved coupling shown is designed to transmit power from the driving shaft $a$ to a driven shaft $b$ which is located out of line in relation thereto by any desired amount $e$. The driven shaft $b$ which is shown hollow may be for instance the axle of a motor vehicle, in which case the eccentricity may vary considerably during travel. To the shaft $a$ there are rigidly fixed by means of the disk $c$, the two crank pins $d_1$ $d_2$ on which the toothed segments $z_1$ $z_2$ are adapted to rock. These segments are formed with extensions $g_1$ $g_2$ to which rods $s_1$ $s_2$ are connected, the other ends of which are connected to the crank pins $f_1$ $f_2$ of a wheel $h$ mounted on the shaft $b$. The normal position of the coupling is shown in Figs. 1, 3 and 5.

Figs. 3–6 show the positions of the parts of the coupling in the four main positions of the shafts. From these figures it will be seen that there is no appreciable lead of one or the other shaft in any position, that is to say, the shafts have practically approximately equal angular velocities during the whole of each revolution.

The coupling as shown in the drawings is to be understood as illustrating only a constructional example of the manner in which the invention can be carried out. It is immaterial which of the two shafts $a$ and $b$ is the driving shaft and which is the driven shaft. For the purpose of enabling the coupling to withstand any shocks in the working or any sudden shocks that are to be expected, a spring intermediate member may be inserted at any desired point in the transmission of the power, and for instance the rods $s_1$ $s_2$ of the coupling may be made elastic as shown in Fig. 7.

This insertion of a spring member is particularly necessary if it is important to equalize the small periodic variations in the angular velocity due to the finite length of the rods $s_1$ $s_2$. The said periodical differences become dangerous in spite of the spring arrangement, if they come into resonance with any other periodic oscillations. The only means of preventing this is to completely equalize the differences in the angular velocities. This equalization may be effected according to the present invention by constructing the coupling two-sided, that is to say, connecting the shafts that are parallel to each other, by means of two couplings, and shifting these couplings relatively to each other around the shaft to an extent corresponding to the period of the variations that are to be expected. By this means the differences of velocity produced in the couplings will counteract each other and thus have no reflex action upon the driving shaft.

What I claim is:—

1. In a coupling for a driving and a driven shaft located out of line with each other, the combination of two crank pins on one shaft, two interengaging toothed segments fulcrumed one on each of said crank pins, two crank pins on the other shaft, and two rods of equal length connecting said toothed segments to the second mentioned crank pins, whereby the coupling in its normal position is symmetric to a plane extending through the eccentric center lines of said two shafts, but is non-symmetric to the plane located at right angles to the aforesaid plane.

2. In a coupling for a driving and a driven shaft located out of line with each other, the combination of two crank pins on one shaft, two interengaging toothed segments fulcrumed one on each of said crank pins, extensions on said toothed segments, two crank pins on the other shaft, and two rods of equal length connecting the extensions on said toothed segments to the second mentioned crank pins.

3. In a coupling for a driving and a driven shaft located out of line with each other, the combination of two crank pins on one shaft, two interengaging toothed segments fulcrumed one on each of said crank pins, two crank pins on the other shaft, two rods of equal length connecting said toothed segments to the second mentioned crank pins, and interposed spring members to absorb shocks.

4. In a coupling for a driving and a driven shaft located out of line with each other, the combination of two crank pins on one shaft, two interengaging toothed segments fulcrumed one on each of said crank pins, two crank pins on the other shaft, two rods of equal length connecting said toothed segments to the second mentioned crank pins, and longitudinal spring members on said rods to absorb shocks.

5. In a coupling for a driving and a driven shaft located out of line with each other, the arrangement at each end of the driving and driven shaft, of two crank pins on one shaft, two interengaging toothed segments fulcrumed one on each of said crank pins, two crank pins on the other shaft, and two rods of equal length connecting said toothed segments to the second mentioned crank pins, the combinations at the ends of the driving and driven shafts being located at a determined angular distance apart, whereby the periodic variations in the angular velocity of the driven shaft are not transmitted back to the driving shaft.

In testimony whereof I have signed my name to this specification.

JACOB BUCHLI.